United States Patent
Brown et al.

(10) Patent No.: US 7,107,596 B2
(45) Date of Patent: Sep. 12, 2006

(54) STATISTICALLY-TRIGGERED HEURISTICS

(75) Inventors: Kyle G. Brown, Apex, NC (US); James E. Fox, Apex, NC (US); Robert C. Leah, Cary, NC (US); Lisa H. Magee, Morrisville, NC (US); Erich S. Magee, Morrisville, NC (US); Steven M. Miller, Apex, NC (US); Mark D. Weitzel, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 10/097,953

(22) Filed: Mar. 14, 2002

(65) Prior Publication Data

US 2003/0177225 A1 Sep. 18, 2003

(51) Int. Cl.
*G06F 9/46* (2006.01)

(52) U.S. Cl. .................. 719/316; 719/318; 719/328; 709/203; 709/224; 705/7

(58) Field of Classification Search .............. 705/1, 705/7; 719/315, 316, 318, 328; 709/203, 709/224; 717/108; 718/105
See application file for complete search history.

(56) References Cited

U.S. PATENT DOCUMENTS

| | | | |
|---|---|---|---|
| 6,427,161 B1 * | 7/2002 | LiVecchi | 718/102 |
| 6,457,010 B1 * | 9/2002 | Eldering et al. | 707/10 |
| 6,643,633 B1 * | 11/2003 | Chau et al. | 707/1 |
| 6,823,515 B1 * | 11/2004 | LiVecchi | 718/105 |
| 6,842,892 B1 * | 1/2005 | Goldberg et al. | 717/108 |
| 2003/0004746 A1 * | 1/2003 | Kheirolomoom et al. | 705/1 |

OTHER PUBLICATIONS

Robertson et al. "Tools and heuristics for operation of network applications", 1993 IEEE, pp. 112-116.*
Lo "Heuristics algorithms for task assignment in distributed systems" 1988 IEEE, pp. 1384-1397.*
Bea Weblogic Enterprise 5.1: Transaction Service 2000 Bea Systems.*
Gehlsen et al. "A Framework for Distributed Simulation Optimization", 2001, pp. 508-514.*

* cited by examiner

*Primary Examiner*—William Thomson
*Assistant Examiner*—Van H. Nguyen
(74) *Attorney, Agent, or Firm*—Marcia L. Doubet

(57) ABSTRACT

Methods, systems, and computer program products for providing a heuristics service using a generically-consumable, reusable heuristics manager object. This heuristics manager object provides a "black box" approach to statistically-triggered heuristics, and eliminates the need to write application-specific code for compiling statistics and performing complicated analysis of those statistics within each application program. In one embodiment, the heuristics manager object is provided as a web-accessible service, which may be registered in a network-accessible registry such as a UDDI registry. Enterprises may subscribe to this service for monitoring and analyzing statistics pertaining to one or more of the enterprise's applications, thereby providing a novel method of doing business for the provider of the heuristics service.

23 Claims, 12 Drawing Sheets

Application Registration

Application Set-up

Event Logging

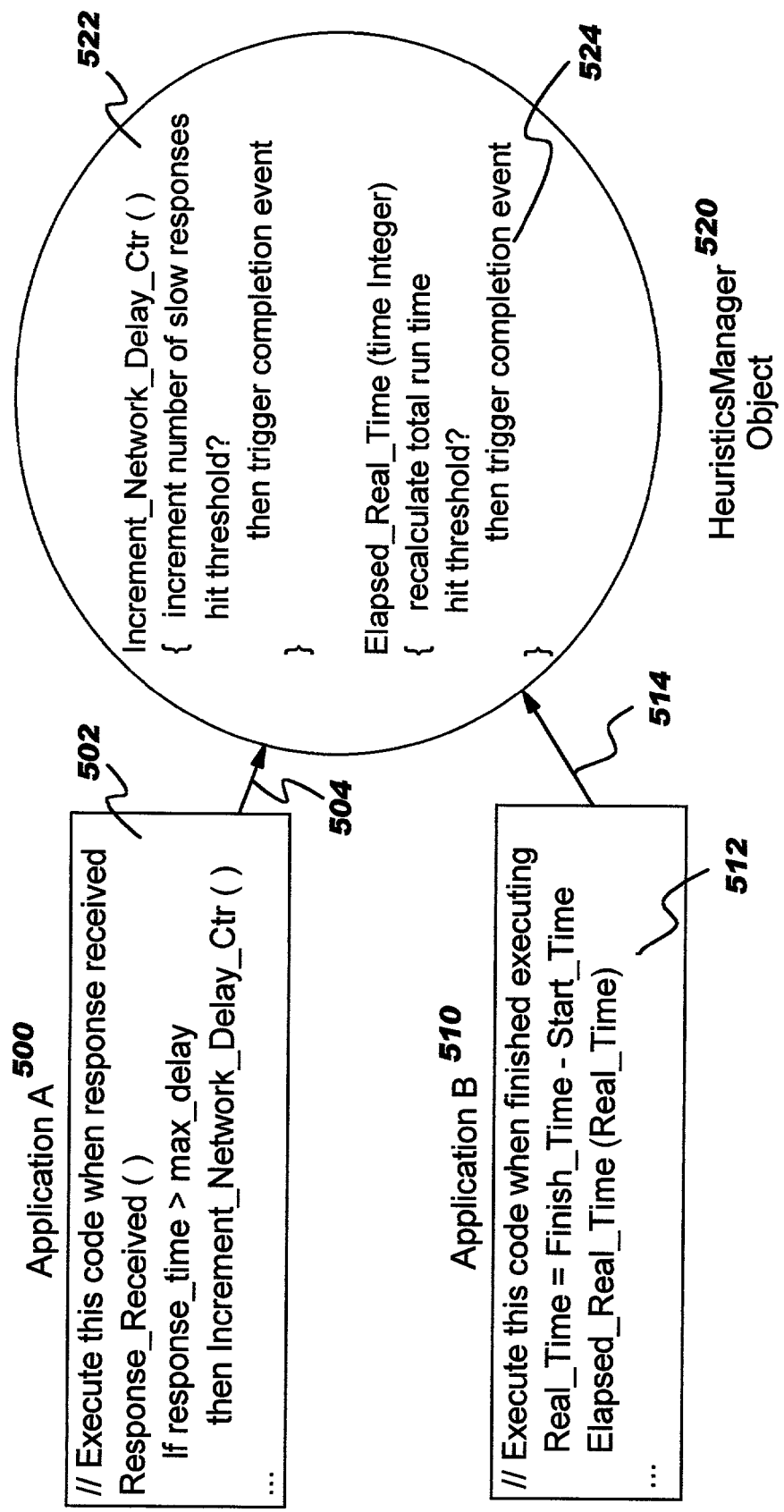

```xml
<?xml version="1.0" encoding="UTF-8"?>

<!-- ************************************************** -->
<!--                                                    -->
<!-- Heuristic Services Interface definition            -->
<!--                                                    -->
<!-- This defines an interface for generic use of a heuristic -->
<!-- engine service.                                    -->
<!--                                                    -->
<!-- ************************************************** -->

<definitions

<!-- ************************************************** -->
    <!-- Define the service and name spaces.                -->
    <!-- ************************************************** -->
    name="HeuristicServicesInterface"
    targetNamespace="http://www.ibm.com/hsi/definitions/HeuristicServicesInterface"
    xmlns="http://schemas.xmlsoap.org/wsdl/"
    xmlns:tns="http://www.ibm.com/hsi/definitions/HeuristicServicesInterface"
    xmlns:xsd="http://www.w3.org/2001/XMLSchema"
    xmlns:xsd1="http://www.ibm.com/hsi/schemas/HeuristicServicesInterface"
    xmlns:soap="http://schemas.xmlsoap.org/wsdl/soap/">

<!-- ************************************************** -->
    <!-- Define the messages supported by the service.      -->
    <!-- ************************************************** -->
610 <message name="registerRequest">
      <part name="hostName" type="xsd:string"/>
      <part name="applicationName" type="xsd:string"/>
    </message>
    <message name="registerResponse">
      <part name="result" type="xsd:int"/>
    </message>
```

FIG. 6B

```
620  <message name="monitorEventTypeRequest">
        <part name="hostName" type="xsd:string"/>
        <part name="applicationName" type="xsd:string"/>
        <part name="eventType" type="xsd:string"/>
        <part name="priority" type="xsd:int"/>
     </message>
     <message name="monitorEventTypeResponse">
        <part name="result" type="xsd:int"/>
     </message>

630  <message name="logEventRequest">
        <part name="hostName" type="xsd:string"/>
        <part name="applicationName" type="xsd:string"/>
        <part name="eventType" type="xsd:string"/>
        <part name="magnitude" type="xsd:string"/>
     </message>
     <message name="logEventResponse">
        <part name="result" type="xsd:int"/>
     </message>

640  <message name="getStatusRequest">
        <part name="hostName" type="xsd:string"/>
        <part name="applicationName" type="xsd:string"/>
     </message>
     <message name="getStatusResponse">
        <part name="result" type="xsd1:anyElement"/>
     </message>

<!-- ************************************************* -->
     <!-- Define the operations supported by the service.   -->
     <!-- ************************************************* -->
     <portType name="HeuristicServicePortType">
650     <operation name="register">
           <input name="registerRequest" message="tns:registerRequest"/>
           <output name="registerResponse" message="tns:registerResponse"/>
        </operation>
```

FIG. 6C

```
660  <operation name="monitorEventType">
        <input name="monitorEventTypeRequest"
               message="tns:monitorEventTypeRequest"/>
        <output name="monitorEventTypeResponse"
               message="tns:monitorEventTypeResponse"/>
     </operation>

670  <operation name="logEvent">
        <input name="logEventRequest" message="tns:logEventRequest"/>
        <output name="logEventResponse" message="tns:logEventResponse"/>
     </operation>

680  <operation name="getStatus">
        <input name="getStatusRequest" message="tns:getStatusRequest"/>
        <output name="getStatusResponse" message="tns:getStatusResponse"/>
     </operation>
     </portType>

<!-- *********************************************************** -->
     <!-- Bind the operation to an implementation.                     -->
     <!-- *********************************************************** -->
690  <binding name="HeuristicServiceBinding" type="tns:HeuristicServicePortType">
        <soap:binding style="rpc" transport="http://schemas.xmlsoap.org/soap/http"/>
        <operation name="register">
         <soap:operation soapAction="" style="rpc"/>
         <input name="registerRequest">
           <soap:body
             use="encoded"
             encodingStyle="http://schemas.xmlsoap.org/soap/encoding/"
             namespace="http://www.ibm.com/hsi/HeuristicService"/>
         </input>
         <output name="registerResponse">
           <soap:body
             use="encoded"
             encodingStyle="http://schemas.xmlsoap.org/soap/encoding/"
             namespace="http://www.ibm.com/hsi/HeuristicService"/>
         </output>
        </operation>
```

FIG. 6D

```
<operation name="monitorEventType">
  <soap:operation soapAction="" style="rpc"/>
  <input name="monitorEventTypeRequest">
    <soap:body
      use="encoded"
      encodingStyle="http://schemas.xmlsoap.org/soap/encoding/"
      namespace="http://www.ibm.com/hsi/HeuristicService"/>
  </input>
  <output name="monitorEventTypeResponse">
    <soap:body
      use="encoded"
      encodingStyle="http://schemas.xmlsoap.org/soap/encoding/"
      namespace="http://www.ibm.com/hsi/HeuristicService"/>
  </output>
</operation>

<operation name="logEvent">
  <soap:operation soapAction="" style="rpc"/>
  <input name="logEventRequest">
    <soap:body
      use="encoded"
      encodingStyle="http://schemas.xmlsoap.org/soap/encoding/"
      namespace="http://www.ibm.com/hsi/HeuristicService"/>
  </input>
  <output name="logEventResponse">
    <soap:body
      use="encoded"
      encodingStyle="http://schemas.xmlsoap.org/soap/encoding/"
      namespace="http://www.ibm.com/hsi/HeuristicService"/>
  </output>
</operation>
```

FIG. 6E

```
      <operation name="getStatus">
        <soap:operation soapAction="" style="rpc"/>
        <input name="getStatusRequest">
          <soap:body
            use="encoded"
            encodingStyle="http://schemas.xmlsoap.org/soap/encoding/"
            namespace="http://www.ibm.com/hsi/HeuristicService"/>
        </input>
695     <output name="getStatusResponse">
          <soap:body
           use="literal"
           encodingStyle="http://xml.apache.org/xml-soap/literalxml"
           namespace="http://www.ibm.com/hsi/HeuristicService"/>
        </output>
      </operation>
    </binding>

</definitions>
```

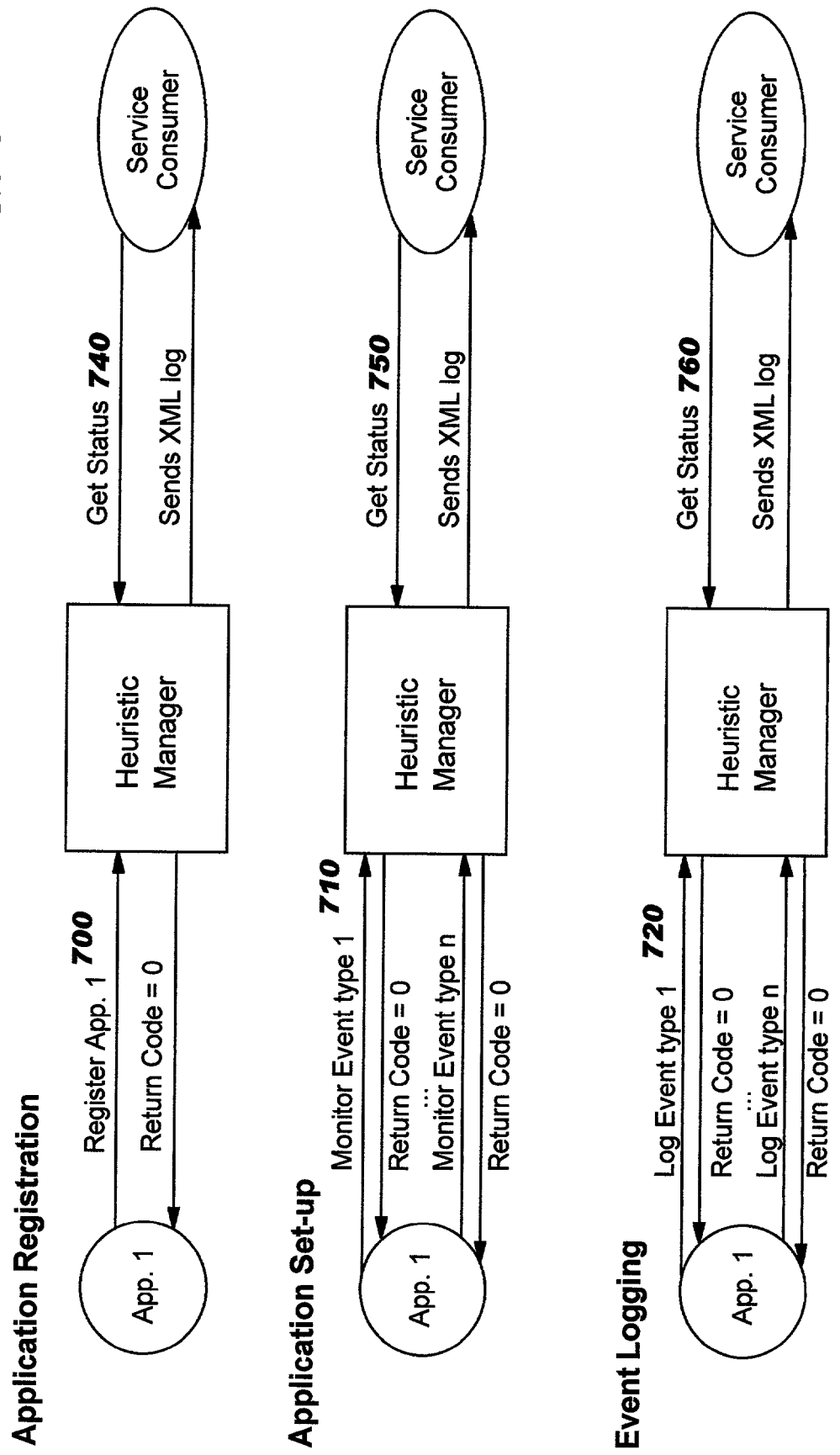

FIG. 8

800 public int register(String hostName, String applicationName)
    Create unique key using application name and generated numeric identifier
    Add application key and host name to table of registered applications 810 public int monitorEventType(String hostName, String applicationName,
                                String eventType, int priority)
    Add the event type to table of monitored events types for registered app
    Apply priority as a weight on the heuristic which maps to the event type 820 public int logEvent(String hostName, String applicationName,
                        String eventType, int magnitude)
    Accept event of specified type and magnitude
    Supply event and magnitude to appropriate heuristics function(s)
    Return zero for normal event log
    Return one for event triggered completion 830 public org.w3c.dom.Document getStatus(String hostName, String applicationName)
    Answer an XML document containing a complete log of activity for the application

STATISTICALLY-TRIGGERED HEURISTICS

BACKGROUND OF THE INVENTION

1. Field of the Invention

The present invention relates to a computer system, and deals more particularly with methods, systems, computer program products, and methods of doing business wherein executing application programs can use an external statistically-triggered heuristics monitor.

2. Description of the Related Art

When using processor-intensive calculations, it is a standard practice in the industry to provide algorithms for monitoring system performance, where those algorithms are optimized through use of one or more heuristics. Heuristics typically exist as paper algorithms and formulas, and to apply one or more heuristics to a specific application requires individual implementation in an application program. For example, the typical approach is to write native application support code in which statistics are gathered and compared to heuristics within a loop or called routine. This approach is effective, but it has a number of drawbacks. As one example, it is highly implementation-dependent, providing a solution that is tailored to a particular application. Therefore, existing implementations do not lend themselves to being reused among applications. As another example, programmers who provide these application-specific solutions need to write code that assumes an in-depth understanding of complex mathematical calculations, and programmers having such skills are not widely available. Furthermore, a side-effect of complex code is that program development, testing, and support costs increase, and programs tend to be more error-prone.

Yet, many applications can benefit from statistical monitoring which applies heuristics. Accordingly, what is needed is a solution that provides these benefits but avoids the limitations of prior art approaches.

SUMMARY OF THE INVENTION

An object of the present invention is to provide improved techniques for application programs to use heuristics.

Another object of the present invention to provide heuristics in a reusable form that can be leveraged by multiple applications.

Still another object of the present invention is to provide statistically-triggered heuristics that can be accessed as a network-accessible resource.

A further object of the present invention is to provide techniques for application programs to access heuristics which are implemented as external, generically-consumable resources.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for providing a heuristics service. In preferred embodiments, this comprises the technique of encapsulating one or more heuristics function in a heuristics object, and deploying the heuristics object as the heuristics service. Preferably, the heuristics object is a generically-consumable object.

The technique may further comprise accessing, by an application program (or by a plurality of application programs), the deployed heuristics object.

In a first preferred embodiment, the accessing may further comprise registering, by a particular application program, as a listener for one or more heuristics events generated by the heuristics functions. In this embodiment, the technique may further comprise the heuristics object asynchronously notifying the registered listeners of occurrence of selected heuristics events.

In a second preferred embodiment, the accessing may further comprise registering a particular application program with the heuristics object.

In either embodiment, the accessing may further comprise submitting, by a particular application program, statistical information to the heuristics object for application of one or more of the heuristics functions. The heuristics functions to be applied are preferably determined by a mapping encapsulated within the heuristics object. The accessing may comprise informing the heuristics object of one or more event types which are of interest to a particular application program, and/or requesting status information from the heuristics object.

The deploying may further comprise registering the heuristics service in a network-accessible registry. The requests for status information may be submitted by a service consumer which locates the heuristics service using the network-accessible registry. A heuristics service definition specified as a markup language document is preferably used when registering the heuristics service. The registry may be a Universal Description, Discovery, and Integration ("UDDI") registry and the markup language may be Web Services Description Language ("WSDL").

Prior to performing the accesses, each of the application programs may programmatically locate the heuristics service in a network-accessible registry and programmatically bind to the located service.

The present invention may also be used for analyzing statistics using heuristics in an embodiment comprising: a data structure providing one or more executable heuristics functions for analyzing statistics, the data structure having an application programming interface ("API") with which application programs can access the executable heuristics functions; receiving, on a computing device where the data structure can be accessed, one or more access requests from application programs; and performing corresponding one of the executable heuristics functions, responsive to receiving access requests.

The present invention may also be used advantageously in methods of doing business. For example, a heuristics monitoring/analysis service may be provided, where customers (who pay, for example, a subscription fee) can design their application programs to submit statistics to this service for analysis and feedback.

Another embodiment of the present invention may comprise: encapsulating one or more heuristics functions in a heuristics object; registering a heuristics service in a network-accessible registry, wherein the registered service uses the heuristics functions in the heuristics object; programmatically accepting statistical information from application programs; and applying selected ones of the heuristics functions to the accepted statistical information, wherein the selected ones are determined programmatically according to a mapping encapsulated within the heuristics object. This embodiment may further comprise charging owners of the application programs for the application of the selected heuristics functions.

The present invention will now be described with reference to the following drawings, in which like reference numbers denote the same element throughout.

BRIEF DESCRIPTION OF THE DRAWINGS

FIG. 5 provides an example showing interactions between application program code and the external heuristics manager object of the present invention;

FIG. 6 (comprising FIGS. 6A–6E provides a sample markup language document showing how a network-accessible heuristics service may be defined for inclusion in a network-accessible registry, according to the second preferred embodiment of the present invention;

FIG. 7 illustrates the flow of messages between components when the service definition of FIG. 6 is used to provide a heuristics service; and FIG. 8 provides pseudocode showing how routines of the heuristics manager object of the second preferred embodiment might be implemented.

DESCRIPTION OF PREFERRED EMBODIMENTS

Figure 1:
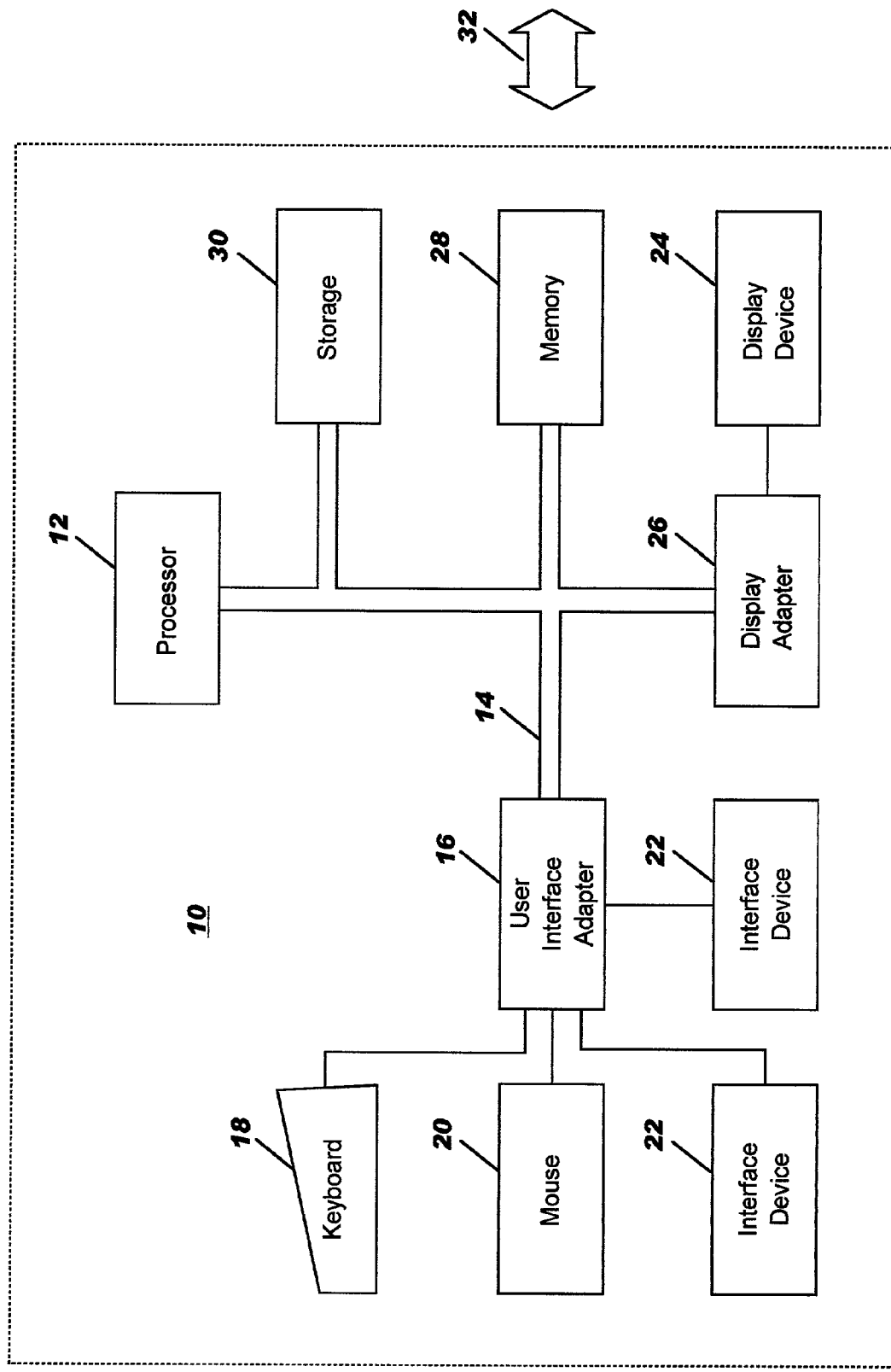
FIG. 1 is a block diagram of a computer hardware environment in which the present invention may be practiced.

FIG. 1 illustrates a representative computer hardware environment in which the present invention may be practiced. The device 10 illustrated therein may be a handheld computer, a personal computer, a laptop computer, a server or mainframe, and so forth. The device 10 typically includes a microprocessor 12 and a bus 14 employed to connect and enable communication between the microprocessor 12 and the components of the device 10 in accordance with known techniques. The device 10 typically includes a user interface adapter 16, which connects the microprocessor 12 via the bus 14 to one or more interface devices, such as a keyboard 18, mouse 20, and/or other interface devices 22 (such as a touch sensitive screen, digitized entry pad, etc.). The bus 14 also typically connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The device 10 may communicate with other computers or networks of computers, for example via a communications channel or modem 32. Alternatively, the device 10 may communicate using a wireless interface at 32, such as a cellular digital packet data ("CDPD") card. The device 10 may be associated with such other computers in a local area network ("LAN") or a wide area network ("WAN"), or the device 10 can be a client in a client/server arrangement with another computer, etc. All of these configurations, as well as the appropriate communications hardware and software which enable their use, are known in the art.

Figure 2:
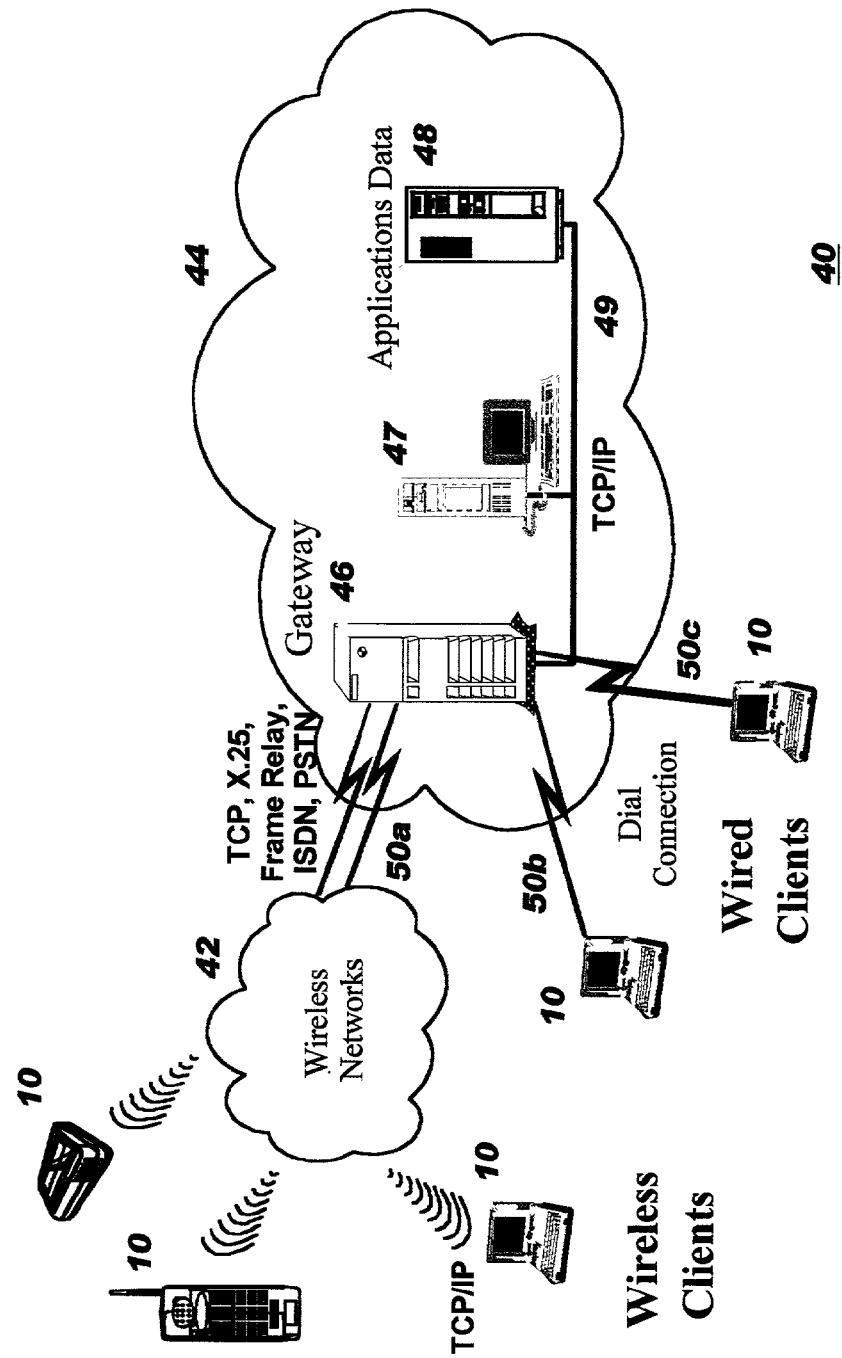
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of devices 10. Additionally, as those skilled in the art will appreciate, one or more LANs may be included (not shown), where a LAN may comprise a plurality of intelligent workstations or similar devices coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be coupled to another network 42 by means of a communications link 50a. The gateway 46 may also be directly coupled to one or more devices 10 using a communications link 50b, 50c. Further, the gateway 46 may be indirectly coupled to one or more devices 10. The gateway computer 46 may also be coupled 49 to a storage device (such as data repository 48). The gateway computer 46 may be implemented utilizing an Enterprise Systems Architecture/370™ computer available from the International Business Machines Corporation ("IBM"), an Enterprise Systems Architecture/390® computer, etc. Depending on the application, a midrange computer, such as an Application System/400® (also known as an AS/400®) may be employed. ("Enterprise Systems Architecture/370" is a trademark of IBM; "Enterprise Systems Architecture/390", "Application System/400", and "AS/400" are registered trademarks of IBM.).

Those skilled in the art will appreciate that the gateway computer 46 may be located a great geographic distance from the network 42, and similarly, the devices 10 may be located a substantial distance from the networks 42 and 44. For example, the network 42 may be located in California, while the gateway 46 may be located in Texas, and one or more of the devices 10 may be located in New York. The devices 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The devices 10 may alternatively connect directly to the gateway 46 using dial connections 50b or 50c. Further, the wireless network 42 and network 44 may connect to one or more other networks (not shown), in an analogous manner to that depicted in FIG. 2.

In preferred embodiments, the present invention is implemented in software. Software programming code which embodies the present invention is typically accessed by the microprocessor 12 (e.g. of device 10 and/or server 47) from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

Figure 3:
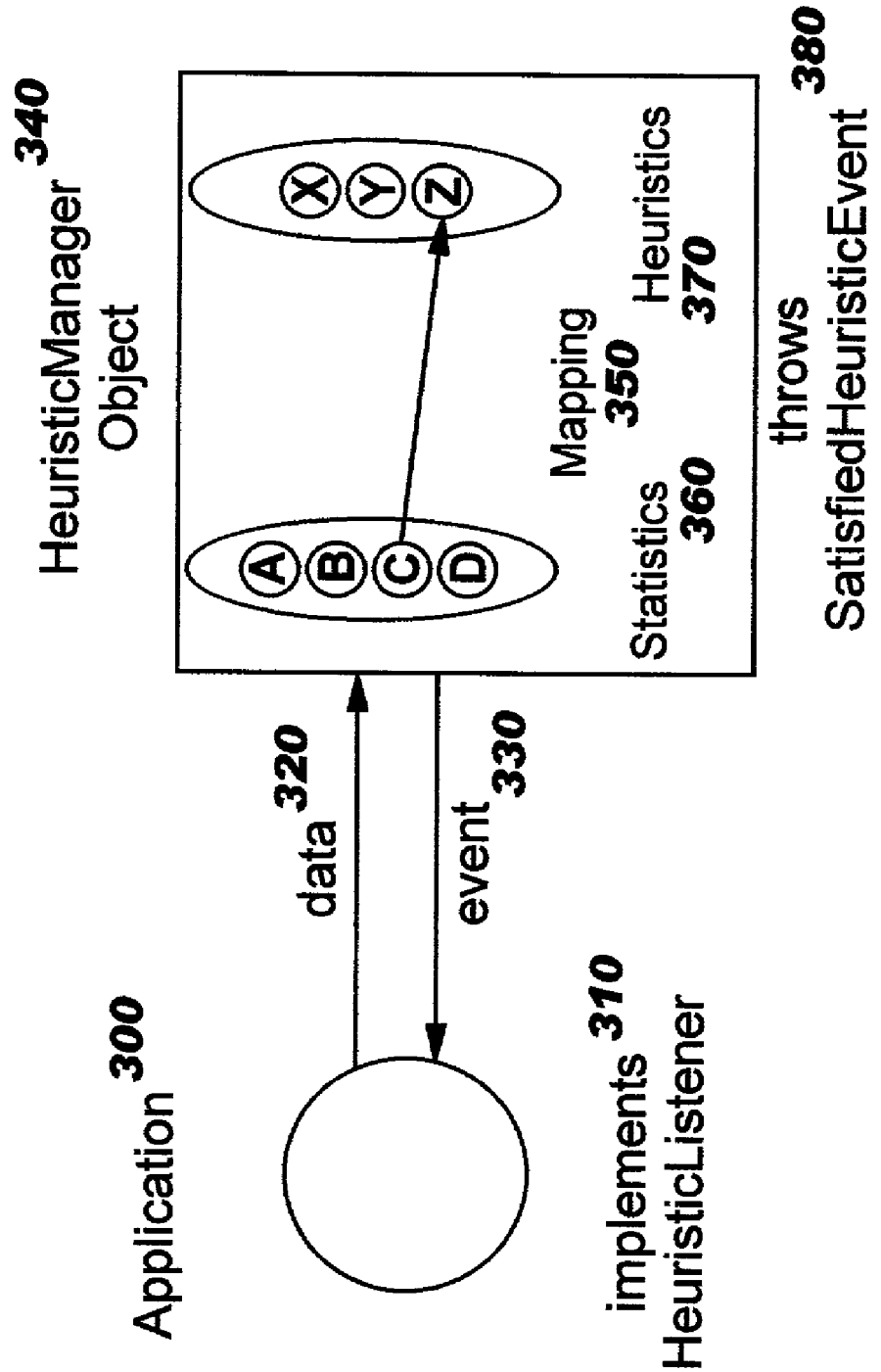
FIG. 3 shows a model illustrating components of a first preferred embodiment of the present invention.

FIG. 3 provides an example implementation model according to which a first preferred embodiment of the present invention may operate. An application program 300 generates statistical information, and supplies 320 this information to a heuristics manager object 340. Many different types of statistical information might be generated, depending on the needs of a particular application. The details of the statistics, and the computational details of the heuristic algorithms which use them, do not form part of the inventive concepts of the present invention. Examples of statistics that might be provided include information about the application's memory usage, processor cycle usage, network delay experienced by the application, bandwidth consumption, and so forth. In preferred embodiments, a generically-consumable heuristics manager object 340 is provided, where this object encapsulates code for applying one or more heuristics as a service that may be used by an executing application program. This heuristics manager object 340 maintains a finite set of statistics 360 on an application program, compiling these statistics from the information sent by the application, and applies heuristics 370 to determine when a trigger point (e.g. a threshold) or other type of completion event is reached. (Hereinafter, the term "completion event" is used for ease of reference when discussing any type of event that may be detected by a particular implementation of heuristics analysis logic.) Preferred embodiments of the heuristics manager object 340 include a mapping function 350 that determines which statistical input data is used with which heuristic.

This first embodiment preferably operates in an asynchronous manner, and implements an interface, referred to in the FIG. as "HeuristicListener" 310, that understands how to receive an event 330 from the heuristics manager object. (Typically, an application program 300 implemented according to the first preferred embodiment will register as a listener for heuristics events. This type of registration and listening scenario is generally known in the art, although its use for statistically-triggered heuristics is not known in the prior art.) The heuristics manager object preferably applies the heuristics in an iterative manner, using a timer-driven or event-driven approach. An example of an event that preferably triggers application of the heuristics to the gathered statistics is receipt of incoming data from an application, as shown at element 320 of FIG. 3 (and also as element 410 of FIG. 4, described below with reference to the second preferred embodiment). An event that may, in some implementations, trigger the heuristics analysis is receipt of a status inquiry 470 from a service consumer 480 (also described below). An implementation of the heuristics manager object in this first preferred embodiment may choose to support only event-driven analysis, and/or it may choose to support timer-driven analysis.

The example in FIG. 3 depicts four types of statistics 360 that are monitored by the heuristics manager object 340, referring to those statistics abstractly as "A", "B", "C", and "D". Three types of heuristics 370, referred to as "X", "Y", and "Z", are also depicted. Suppose statistic "C" represents network bandwidth measurements, and according to the mapping 350, heuristic "Z" analyzes these measurements. (For ease of illustration, mappings have not been shown for the other statistics.) Once a threshold is reached, such as the network delay measurement "C" exceeding some value encoded in heuristic "Z", the heuristics manager object in this asynchronous model throws an exception. This exception is exemplified in FIG. 3 by "SatisfiedHeuristicEvent" 380. This exception results in an event 330 being sent to the application program, through its HeuristicListener interface. (The manner in which the application responds to a generated event when using either of the models shown in FIGS. 3 and 4 is application-specific, and does not form part of the inventive concepts of the present invention.)

Figure 4:
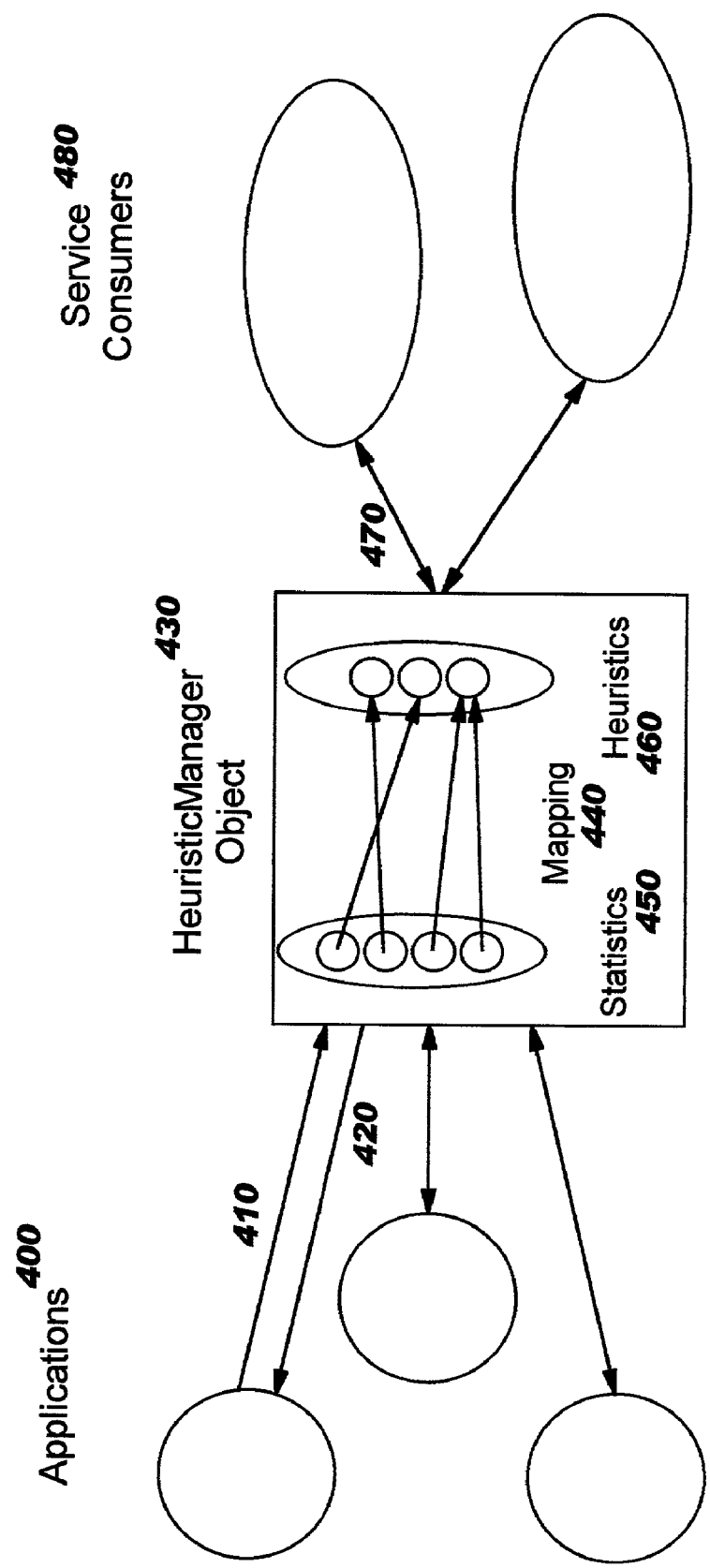
FIG. 4 depicts an alternative model on which a second preferred embodiment is based.

FIG. 4 illustrates a second preferred embodiment, based on a service model in which the statistically-triggered heuristics service is preferably provided as a web-accessible or network-accessible service (referred to equivalently herein as a "web service"). The heuristics service provided by heuristics manager object 430 in this embodiment is preferably registered in a network-accessible registry, such as a Universal Description, Discovery, and Integration ("UDDI") registry, in which case the interface to this registered object is preferably described using a Web Services Description Language ("WSDL") structured markup language document. Application programs can then dynamically query the registry to find one or more providers of the heuristics service disclosed herein, and can programmatically bind to a selected provider of the registered service.

In this embodiment, an application program 400 sends 410 statistics information to heuristics manager object 430 using the object's service interface (described below with reference to FIGS. 6–8). The heuristics manager object receives the statistics 450, compiles them, and in a similar manner to that described for FIG. 3, applies a predetermined heuristic 460 to each statistic based on the defined mapping 440 of a statistic class to an appropriate heuristic.

This second preferred embodiment preferably operates in synchronous mode, whereby information is returned responsive to request messages. If a message received from an application program results in a completion event by one or more of the heuristic functions encapsulated in object 430, a return code is preferably returned 420 to that application program. The application program may act upon that return code in a variety of application-specific ways, which are outside the scope of the present invention.

The heuristics manager object 430 may also be accessed by one or more service consumers 480 to retrieve status information. The service consumers may be taken from the set of application programs 400 that report statistics. Alternatively, the service consumers may be distinct from this set of application programs. For example, an enterprise-wide management function might access the heuristics manager object in the role of service consumer to obtain information on execution of the enterprise's application programs.

In an optional enhancement, embodiments of the heuristics manager object in either model may compile and monitor statistics for multiple application programs simultaneously. When the heuristics manager object supports more than one application program, an identifier of the application program is preferably associated with the compiled statistics. Such an identifier enables associating the compiled statistics with the application, and in the asynchronous model of FIG. 3, enables selectively notifying application programs of triggered events. (An identifier of the application program submitting statistical information to the heuristics manager may be passed by the application program as part of the submitted message.) The identifier also allows application-specific queries to be requested by service consumers in the web services model of FIG. 4.

(Note that service consumers have not been illustrated in FIG. 3. In this asynchronous model, service consumers are primarily the application programs that register as event listeners. Alternatively, a service consumer may be supported using the same, or similar, interface as the applications that report statistics.).

FIG. 5 illustrates an embodiment of the present invention in more detail. FIG. 5 depicts two applications 500, 510, each of which supplies statistics 504, 514 to a heuristics manager object 520. In this example, a first application program 500 includes code 502 that checks, upon receiving a response of some type, to see if some response time value "max_delay" was exceeded. (For purposes of illustration, assume that this response time value represents the time it takes to receive a response over a network connection.) If the time value was exceeded, an "Increment_Network_Delay_Ctr" invocation (to increment a network delay counter) is issued 504. This invocation represents an API call, where the code for the invoked routine is provided in the heuristics manager object 520 (as shown by the sample pseudocode at element 522). One or more of these well-known APIs may be invoked within a particular application, according to the needs of an implementation of the present invention.

FIG. 5 also shows pseudocode of another application program 510, which computes elapsed clock time upon completion of some type of application processing, and reports this information to the heuristics manager object by invoking an "Elapsed_Real_Time" interface 512. This sample invocation transmits 514 an integer value "Real_Time" that is received by a Ail corresponding routine 524 in the heuristics manager object 520.

Although the sample pseudocode illustrated in FIG. 5 is quite simple, it serves to illustrate how the present invention operates. An actual heuristics function may be much more complicated, and as stated earlier, the details of heuristic algorithms are outside the scope of the present invention.

An application program which accesses a heuristics manager object according to the present invention may be deployed to operate on the same device on which the heuristics manager object is provided, or the application program may execute on one device and the heuristics manager object may be deployed to reside on a different device. In the former case, the present invention may be used in a stand-alone mode without having a network connection. In the latter case, the application program may access the heuristics manager object across a network using a wireline connection or a wireless connection (or perhaps using a combination thereof). Wireline connections are those that use physical media such as cables and telephone lines, whereas wireless connections use media such as satellite links, radio frequency waves, and infrared waves. Many connection techniques can be used with these various media, such as: using the device's modem to establish a connection over a telephone line; using a LAN card such as Token Ring or Ethernet; using a cellular modem to establish a wireless connection; etc. The devices on which the application program and heuristics manager object reside may be any type of computer processor, including laptop, handheld or mobile computers; vehicle-mounted devices; desktop computers; mainframe computers; etc., having processing capabilities (and communication capabilities, when the device is network-connected). These techniques are well known in the art, and the hardware devices and software which enable their use are readily available.

The application programs with which the present invention may be used advantageously may be executing on end-user workstations, mainframes or servers, or any other type of device having computing or processing capabilities (including "smart" appliances in the home, cellular phones, personal digital assistants or "PDAs", dashboard devices in vehicles, etc.).

When implemented in software, the present invention may be implemented as one or more modules of one or more computer software programs. The software is preferably implemented using an object-oriented programming language, such as the Java™ programming language. In preferred embodiments of the present invention, represented by FIG. 3, the heuristics manager object is preferably implemented as a JavaBean™ and is accessed using a Java API call. ("Java" and "JavaBean" are trademarks of Sun Microsystems, Inc.).

When the present invention is used in a networking environment, the networking environment may be a Web environment, where an application program executing on one device communicates with a heuristics manager object on another device using a protocol such as HTTP to transfer messages, where the two devices are connected through the Internet. Alternatively, the application program and heuristics manager object may be communicating in other non-Web networking environments (using the Internet, a corporate intranet or extranet, or any other network), for example using techniques such as Remote Method Invocation ("RMI") or Common Object Request Broker Architecture ("CORBA"). Configurations for the environment include a client/server network, as well as a multi-tier environment. Or, as stated above, the present invention may be used in a stand-alone environment, where the application program and heuristics manager object both reside in the same physical device, in which case a network connection is not required. These environments and configurations are well known in the art.

The second preferred embodiment of the present invention, using a web services model, will now be described in more detail. Web services are intended to facilitate "just-in-time" application integration via open web-based standards, such as HTTP ("Hypertext Transfer Protocol"), SOAP ("Simple Object Access Protocol") and/or XML ("Extensible Markup Language") Protocol, WSDL, and UDDI. HTTP is commonly used to exchange messages over TCP/IP ("Transmission Control Protocol/Internet Protocol") networks such as the Internet. SOAP is an XML-based protocol used to invoke methods in a distributed environment. XML Protocol is an evolving specification of the World Wide Web Consortium ("W3C") for an application-layer transfer protocol that will enable application-to-application messaging. XML Protocol may converge with SOAP. WSDL is an XML format for describing distributed network services. UDDI is an XML-based registry technique with which businesses may list their services and with which service requesters may find businesses providing particular services.

Thus, when the statistically-triggered heuristics manager object is provided as a web service, an application with statistics to be monitored—and/or a service consumer that wishes to query the heuristics manager object—may interrogate the UDDI registry to locate this service at run-time, and may dynamically bind to a provider's offering of this service. This preferably occurs using service information which is conveyed in a platform-neutral WSDL format using SOAP/XML Protocol and HTTP messages. (Hereinafter, references to SOAP should be construed as referring equivalently to semantically similar aspects of XML Protocol. For more information on SOAP, refer to http://www.w3.org/TR/2000/NOTE-SOAP-20000508, titled "Simple Object Access Protocol (SOAP) 1.1, W3C Note May 08, 2000". See http://www.w3.org/2000/xp for more information on XML Protocol. More information on WSDL may be found at http://www.w3.org/TR/2001/NOTE-wsdl-20010315, titled "Web Services Description Language (WSDL) 1.1, W3C Note 15March 2001". For more information on UDDI, refer to http://www.uddi.org/specification.html". HTTP is described in Request For Comments ("RFC") 2616 from the Internet Engineering Task Force, titled "Hypertext Transfer Protocol—HTTP/1.1" (June 1999).)

The sample markup language document 600 in FIG. 6 shows how a network-accessible heuristics service may be defined, according to the second embodiment of the present invention. As shown therein, a heuristics service includes an interface for registering applications that will interact with the heuristics manager object (see elements 610 and 650); for specifying that one of a known set of events should be monitored (see elements 620 and 660); for logging a specific event or statistic with the heuristics manager object (see elements 630 and 670); and for querying the heuristics manager object for current status information (see elements 640 and 680). As will be obvious, the illustrated messages and operations are merely illustrative of one way in which the heuristics service may be provided.

In the example of FIG. 6, the "register" operation 650 has a request message and a response message. As specified at element 610, the request message identifies the application that is to be registered, preferably by supplying its name as a string value. A host name parameter is preferably supplied to identify the device on which this application program is executing. (The value of this parameter may be a network address.) In preferred embodiments, each application sends its own registration message.

Referring now to FIG. 7, the application registration operation is depicted at 700, where an application named "App. 1" sends a registration message to the heuristics manager object. The response message in this example, again referring to element 610, provides an integer return code. FIG. 7 shows a return code of "0" being returned, which presumably signifies that the registration of "App. 1"completed successfully.

The pseudocode in FIG. 8 illustrates how the heuristics manager object might implement the register service. See element 800. As shown therein, the heuristics manager object may create a unique key for this application, using (for example) its supplied name and a randomly-generated numeric identifier, and may then store this application key in a table or other repository of registered applications. Preferably, the host name value is also stored in this repository.

The "monitorEventType"operation 660 in this example also has a request message and a response message. As specified at element 620, the request message specifies the type of event and also provides a priority value. The request message also pretbrably identifies the host name and application name for which this request is being submitted. A priority value parameter may be used as a weight on the heuristic analysis for this event type, based on the event type's importance to this particular application. Alternatively, an interface might omit the priority parameter. The event type is depicted as being a string value, although alternatively numeric identifiers might be used, and the priority is preferably an integer value.

An application might submit multiple monitorEventType request messages (e.g. during an application set-up phase), thereby indicating that it is interested in multiple types of events. This is illustrated graphically in FIG. 7 at element 710, where the application named "App. 1" is shown as sending monitorEventType request messages for "n" different events. A response message is preferably returned for each such request message, providing an integer return code to indicate whether the monitor request completed successfully.

An illustrative set of event type values is the following set:

(1) MEMORY_ALLOCATION
(2) PROCESSOR_USAGE
(3) NETWORK_BANDWIDTH
(4) REAL_TIME (i.e. elapsed clock time) Additional and/or different event types might be supported by an implementation of the present invention, based on the heuristics that are provided in a particular heuristics manager object.

Element 810 of the pseudocode in FIG. 8 shows how the heuristics manager object might implement the monitorEventType service. As shown therein, the heuristics manager object might add the specified event type to a table or other repository of monitored-event types for this application, and apply the specified priority (for example, by storing it in an object or data structure associated with the present application, for subsequent use when performing heuristics analysis for that application).

The "logEvent" operation 670 in the example service definition has a request message and a response message. As specified at element 630 the request message identifies the type of event that is to be logged with the heuristics manager object, preferably by supplying its name as a string value, as well as a magnitude value. The request message also preferably identifies the host name and application name for which this request is being submitted. In the example, the magnitude value depends on the type of event. For the previously-described illustrative set of four event types, the magnitude values are preferably specified in units of: (1) kilobytes; (2) cycles; (3) kilobytes; and (4) microseconds, respectively.

The log operation is depicted at element 720 of FIG. 7, where the application named "App. 1" sends a plurality of logEvent messages to the heuristics manager object. (For purposes of illustration only, the application is shown as sending a logEvent message for each of the event types for which it sent a monitorEventType message.) Again, each request message preferably has a corresponding response message to signify whether the log operation completed successfully.

Element 820 of the pseudocode in FIG. 8 illustrates a representative implementation of the logEvent service. The pseudocode indicates that the event and magnitude arc accepted and passed to one or more appropriate heuristics functions (according to the defined mapping, as described above with reference to FIG. 4). Preferably, a "0"return code is returned on the response message if the event is logged normally, and a non-zero return code (such as "1") is returned if a completion event is triggered.

The "getStatus" operation 680 in the example of FIG. 6 also has a request message and a response message. As specified at element 640, the request message specifies the host name and application name for which status information is being requested.

The getStatus request messages are typically issued by service consumers, but may also be submitted by application programs if desired. Multiple getStatus request messages might be submitted, for example to sample the status information periodically. An indication of this is provided in FIG. 7, where a first getStatus request 740 is submitted by a service consumer during the registration phase of application program "App. 1"; a second getStatus message 750 is submitted during the application set-up phase, and a third getStatus message 760 is submitted while the application is executing and sending in logEvent messages.

According to the example service definition, the getStatus response message comprises an XML document that contains, for purposes of illustration, a complete log of the activity which has been logged by the heuristics manager object for this application. Thus, while the SOAP bindings (see element 690 of FIG. 6) which are specified in the service definition document 600 are generally specified as using binary encoding, the binding for the getStatus response message is specified as literal information (see element 695) to accommodate the XML document.

Element 830 of the pseudocode in FIG. 8 shows how the heuristics manager object might implement the getStatus service. As stated therein, the heuristics manager object in this example returns the XML document as has just been discussed.

By providing the heuristics manager function using a generically-consumable object as disclosed herein, the drawbacks of the prior art are avoided. A generically-accessible, reusable object eliminates the application-specific code of prior art approaches, and frees application programmers from the details of writing code for compiling statistics and performing complicated analysis of those statistics within each application program. Instead, the application of heuristics to the compiled statistics according to the present invention is provided using a "black box" approach. In addition, when the heuristics manager object is provided as a web-accessible service, the present invention additionally defines new revenue channels for a provider of heuristics services. For example, a "statistically-triggered heuristics" service provider may register its service through a registry such as a UDDI registry, and enterprises may subscribe to this service for monitoring and analyzing statistics pertaining to one or more of the enterprise's applications.

It should be understood that the two embodiments described herein are not limiting of the inventive concepts of the present invention, and alternative implementation strategies may be used without deviating from the scope of the present invention. Furthermore, preferred embodiments are described with reference to receiving statistics from application programs that are "executing". However, the disclosed techniques may also be used advantageously in after-the-fact reporting scenarios, wherein application programs gather statistical information as they execute but do not report this information until they have otherwise completed their processing. Thus, references herein to "executing" application programs are intended to be illustrative, and specifically include application programs that continue to execute only for purposes of reporting statistics and other types of shut-down processing.

While perferred embodiments of the present invention have been described, additional variations and modifications in those embodiments may occur to those skilled in the art once they learn of the basic inventive concepts. Therein, it is intended that the appended claims shall be construed to include preferred embodiments as well as all such variations and modifications as fall within the spirit and scope of the invention.

What is claimed is:

1. A computer-implemented method of providing a statistically-triggered heuristics service, comprising steps of:
    encapsulating one or more heuristics functions in a network-accessible heuristics object having an application programming interface ("API");
    deploying the heuristics object as the heuristics service, such that the heuristics service is accessible to a plurality of application programs using the API of the deployed heuristics object;
    registering the heuristics service in a network-accessible service registry from which the application programs can programmatically discover the registered heuristics service and the API; and
    submitting, by at least one of the application programs using the API, run-time statistics information to the heuristics service for application, by the heuristics object, of at least one of the heuristics functions thereto, wherein:
        each heuristics function to be applied to the submitted run-time statistics information is determined by the heuristics object, by consulting a mapping encapsulated within the heuristics object wherein the mapping identifies, for each of a plurality of types of run-time statistics information, at least one of the heuristics functions to apply to that type of run-time statistics information; and
        the submitting application programs programmatically discover the API, for use in the submitting step, by consulting the network-accessible service registry.

2. The method according to claim 1, wherein the heuristics object is deployed as a generically-consumable object.

3. The method according to claim 1, further comprising the steps of:
    registering, by each submitting one of the at least one application programs using the API, as a listener for one or more heuristics events generated by the heuristics object upon reaching a predetermined threshold when applying one or more of the heuristics functions; and
    asynchronously receiving, by at least one of the registered application programs from the heuristics service, a notification when one of the heuristics events is generated.

4. The method according to claim 1, comprising the steps of:
    sending a message to the heuristics service, by at least one of the plurality of application programs using the API, to inform the heuristics service of one or more event types which are of interest to the informing application program; and
    a synchronously receiving, by at least one of the informing application programs from the heuristics service, a notification when any one of the event types occurs for which receiving application program has registered, the occurrence being detected by the heuristics object upon any of the applied heuristics functions reaching a predetermined threshold.

5. The method according to claim 1, further comprising the step of requesting, by at least one of the plurality of application programs that programmatically discovers the API by consulting the network-accessible service registry, status information from the heuristics service using the API.

6. The method according to claim 1, further comprising the step of requesting, by a service consumer, status information from the heuristics service using the API, wherein the service consumer programmatically discovers the heuristics service and the API by consulting the network-accessible service registry.

7. The method according to claim 1, wherein the registering step uses a heuristics service definition specified as a markup language document.

8. The method according to claim 7, wherein the registry is a Universal Description, Discovery, and Integration ("UDDI") registry and the markup language is Web Services Description Language ("WSDL").

9. The method according to claim 1, wherein at least one of the submitting application programs programmatically discovers the heuristics service by consulting the network-accessible service registry and programmatically binds to the discovered service prior to performing the submitting step.

10. A computer-implemented method of providing a heuristics service, comprising steps of:
- encapsulating one or more heuristics functions in a heuristics object having an application programming interface ("API");
- registering a heuristics service in a network-accessible registry, wherein the registered service uses the heuristics functions in the heuristics object and the API, such that the heuristics service is accessible to a plurality of application programs using the registered API and is programmatically discoverable by the application programs upon consulting the network-accessible registry;
- programmatically accepting run-time statistics information, by the heuristics object, sent to the API of the programmatically-discovered heuristics service from at least one of the application programs; and
- applying at least one selected one of the heuristics functions to the accepted run-time statistics information, by the heuristics object, wherein the at least one selected one is determined programmatically according to a mapping encapsulated within the heuristics object, wherein the mapping identifies, for each of a plurality of types of run-time statistics information, at least one of the heuristics functions to apply to that type of run-time statistics information.

11. The method according to claim 10, further comprising the step of charging owners of each of the at least one application programs a fee for the application of each of the selected heuristics functions.

12. The method according to claim 10, wherein the applying step is triggered responsive to the accepting step.

13. The method according to claim 10, wherein the applying step is triggered responsive to receiving, by the heuristics service, a status inquiry.

14. The method according to claim 10, wherein the applying step is triggered by expiration of a timer.

15. The method according to claim 10, wherein the applying step is triggered responsive to the accepting step, and further comprising the step of sending a response message, from the heuristics service to the sending application program responsive to the applying step, notifying the sending application whether the at least one selected one of the heuristics functions applied to the accepted run-time statistics information generated an event.

16. The method according to claim 10, wherein the accepted run-time statistics information pertains to memory usage by the sending application program.

17. The method according to claim 10, wherein the accepted run-time statistics information pertains to processor cycle usage by the sending application program.

18. The method according to claim 10, wherein the accepted run-time statistics information pertains to one of bandwidth consumption or network delay experienced by the sending application program.

19. A computer system for providing a statistically-triggered heuristics service, comprising:
- a generically-consumable heuristics object which encapsulates one or more heuristics functions;
- means for deploying the heuristics object as the heuristics service, such that an application programming interface ("API") of the heuristics service is usable by a plurality of application programs for accessing the encapsulated heuristics functions;
- means for accepting run-time statistics information, by the heuristics object, sent to the heuristics service from at least one of the application programs using the API;
- means for applying at least one selected one of the heuristics functions to the accepted run-time statistics information, by the heuristics object, wherein each selected one is determined programmatically according to a mapping encapsulated within the heuristics object, wherein the mapping identifies, for each of a plurality of types of run-time statistics information, at least one of the heuristics functions to apply to that type of run-time statistics information,
- means for receiving a registration message, by the heuristics service from at least one of the application programs using the API, requesting the heuristics service to register that application program as a listener for one or more heuristics events that to be generated by the heuristics object if a corresponding threshold is reached when applying one or more of the heuristics functions, and means for asynchronously notifying, by the heuristics service, the registered listeners upon occurrence of any of the heuristics events for which that listener is registered.

20. The system according to claim 19, further comprising:
- means for receiving, by the heuristics service using the API, at least one message requesting status information from the heuristics objects; and
- means for responding to each of the received status-requesting messages, by the heuristics service, with run-time statistics information pertaining to at least one of the plurality of application programs.

21. A computer program product for providing a heuristics service, the computer program product embodied on one or more computer-readable storage media and comprising:
- computer-readable program code for deploying, as a network-accessible heuristics service usable by a plurality of application programs, a heuristics object which encapsulates one or more heuristics functions, such that an application programming interface ("API") of the heuristics service is usable by the application programs for accessing the encapsulated heuristics functions;
- computer-readable code for accepting run-time statistics information, by the heuristics object, sent to the heuristics service from at least one of the application programs using the API;
- computer-readable code for applying at least one selected one of the heuristics functions to the accepted run-time statistics information, by the heuristics object, wherein each selected one is determined programmatically according to a mapping encapsulated within the heuristics object, wherein the mapping identifies, for each of a plurality of types of run-time statistics information, at least one of the heuristics functions to apply to that type of run-time statistics information,
- computer-readable program code for receiving a registration message, by the heuristics service from at least one of the application programs using the API, requesting the heuristics service to register that application program as a listener for one or more heuristics events that to be generated by the heuristics object if a corresponding threshold is reached when applying one or more of the heuristics functions; and
- computer-readable program code for asynchronously notifying, by the heuristics service, the registered listeners upon occurrence of any of the heuristics events for which that listener is registered.

22. The computer program product according to claim 21, further comprising:

computer-readable program code for receiving, by the heuristics service using the API, at least one message requesting status information from the heuristics object; and computer-readable program code for responding to each of the received status-requesting messages, by the heuristics service, with run-time statistics information pertaining to at least one of the plurality of application programs.

23. A computer system for analyzing statistics using heuristics, comprising:

a data structure providing one or more executable heuristics functions for analyzing statistics, the data structure having an application programming interface ("API") with which application programs can access the executable heuristics functions;

means for registering a heuristics service in a network-accessible registry, wherein the registered service uses the executable heuristics functions in the data structure and the API such that the application programs can programmatically discover the heuristics service by consulting the network-accessible registry;

means for receiving, on a computing device where the data structure can be accessed, one or more access requests sent from application programs to the API of the programmatically discoverable heuristics service, wherein selected ones of the access requests supply run-time statistics information from the application programs; and means for performing at least one corresponding one of the executable heuristics functions, responsive to receiving the selected ones of the access requests, wherein a mapping is consulted to determine which of the executable heuristics functions corresponds to the received selected ones.

\* \* \* \* \*